June 2, 1942.  R. A. GOEPFRICH  2,285,382
MASTER CYLINDER FOR BRAKES
Original Filed March 10, 1938
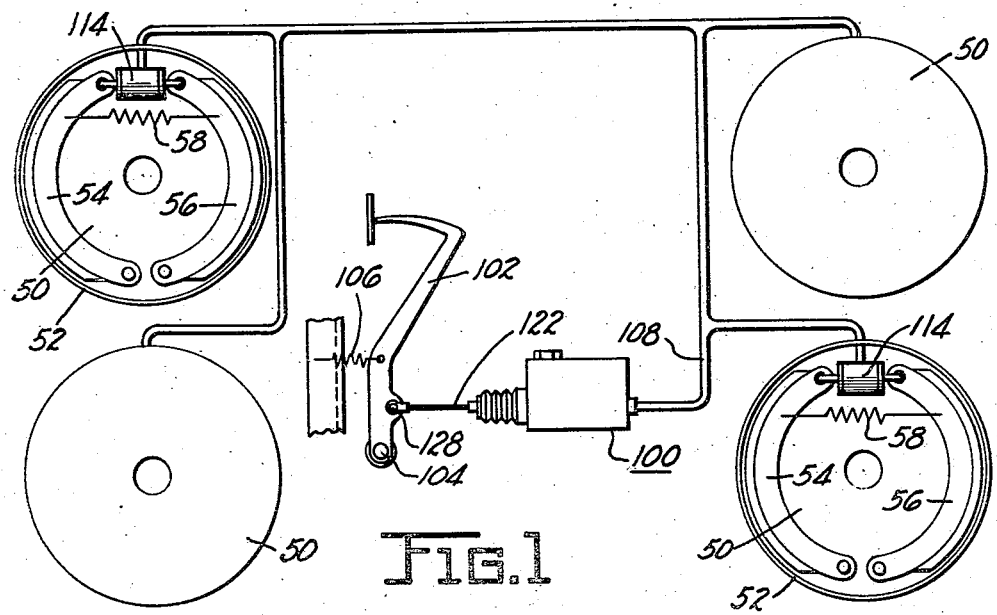
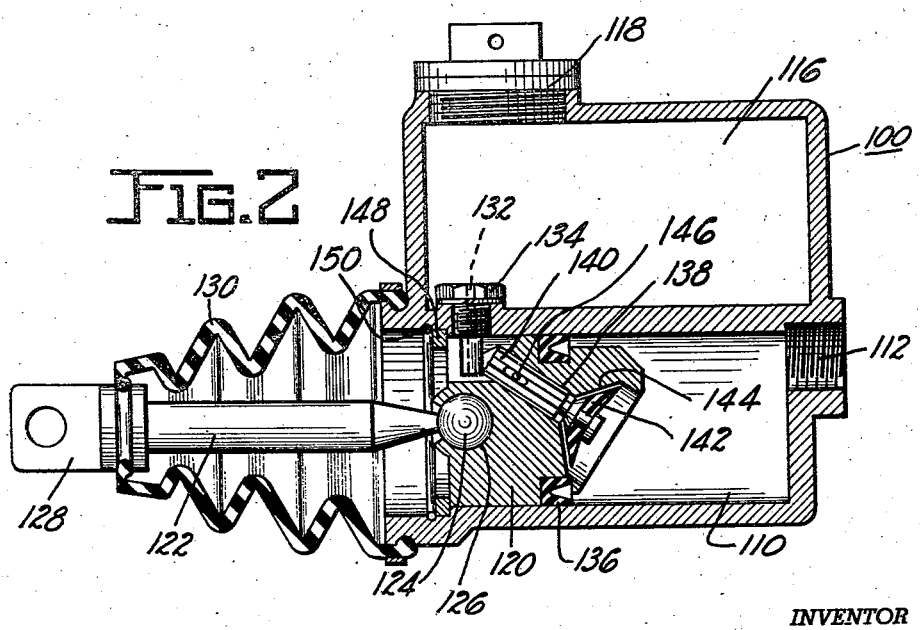
INVENTOR
RUDOLPH A. GOEPFRICH
BY Jerome R. Cox
ATTORNEY Patented June 2, 1942

2,285,382

UNITED STATES PATENT OFFICE 2,285,382

MASTER CYLINDER FOR BRAKES

Rudolph A. Goepfrich, South Bend, Ind., assignor to Bendix Products Corporation, South Bend, Ind., a corporation of Indiana Original application March 10, 1938, Serial No. 195,021 now Patent No. 2,262,843, dated November 18, 1941. Divided and this application December 21, 1940, Serial No. 371,074

4 Claims. (Cl. 60—54.6)

This invention relates to braking systems of the hydraulic or fluid pressure type and more particularly to devices for producing fluid pressure to operate such braking systems. The instant application is a division of my copending application Serial No. 195,021, issued on November 18, 1941, as Patent No. 2,262,843.

In conventional fluid braking systems, the cylinder of the fluid pressure producing device is generally connected to the fluid reservoir by two ports known in the art as the supply port and the compensating port. The latter (compensating) port is usually located so that when the piston is in its maximum retracted position, the port is slightly ahead of a flexible cup seated on the piston head. As the piston travels on its compression stroke the resultant pressure at the head of the piston extends the flexible cup. This expansion of the cup retards the travel of the piston as the cup passes the compensating port. Sometimes the movement past the port even tears the cup. It is the aim of the invention of my copending application Serial No. 107,239, filed October 23, 1936, issued on June 27, 1939 as Patent No. 2,163,874, and also the object of the invention disclosed herein, to overcome this undesirable condition.

An object, therefore, of this invention is to provide a fluid pressure producing device wherein the cylinder is constructed in such a manner as to obviate any undesirable opening into the fluid reservoir tending to be injurious to the piston cup.

A further object of the invention is to provide a fluid pressure producing device having a novel piston permitting by-passing of fluid from the reservoir through itself when the piston is in its retracted position, or during its retracting stroke.

A still further object of this invention is to provide a substantially shorter piston of this type than pistons heretofore proposed or used. Such a piston is simpler in construction, the cylinder bore required is relatively shorter, and the entire fluid pressure producing device consequently takes up less space in the vehicle with the added feature of ease of construction of the entire unit at a substantially reduced cost of manufacture.

Other objects and desirable particular constructions and arrangement of parts will become apparent upon reference to the following detailed description of the illustrative embodiment shown in the accompanying drawing, in which:

Figure 1 is a diagrammatic illustration of a fluid brake system embodying my invention; and Figure 2 is a vertical section through my novel master cylinder showing the piston as in its retracted position.

My novel master cylinder is shown incorporated with a general braking system for a vehicle in Figure 1. As illustrated the said master cylinder is indicated generally by the reference numeral 100.

In Figure 2 the master cylinder 100 is shown in section having a cylinder 110 formed with a discharge port 112, the cylinder being integrally formed with a fluid reservoir 116 which has a vent plug 118 for filling.

The cylinder 110 receives a reciprocable piston 120 suitably connected to a rod 122 having at one of its ends a ball 124 fitted in a recess 126 at the rear of the piston and a clevis 128 at its other end. The clevis 128 is connected to a foot pedal 102 pivoted on a fixed support 104 and having a retractile spring 106 also connected to a fixed support. As pressure is applied to the foot pedal 102 the force is transmitted to the clevis 128 actuating the rod 122 causing the consequent application of the brakes in a manner to be hereinafter more fully described.

A fluid pressure delivery pipe 108 suitably connected to the discharge port 112 of the master cylinder 100 has conduits connected respectively to fluid pressure actuated motors 114 arranged in pairs; one pair for actuation of the brakes associated with the front wheels of the vehicle, and the other for actuation of the brakes associated with the rear wheels of the vehicle.

The brakes may be of the standard type each including a fixed support or backing plate 50, a rotatable drum 52 associated with the backing plate, a pair of corresponding brake shoes 54 and 56 pivoted on the backing plate, and pressure actuated motors 114 mounted on the backing plate 50 between each pair of shoes and operative to actuate the shoes into engagement with the braking surface of the drum 52 against the resistance of a retractile spring 58 connecting the shoes.

A flexible boot 130 sleeved about the rod 122 and suitably fastened to the cylinder at one end and to the clevis 128 at the other end is provided to retain fluid therein and to be retractible with the rod 122.

The fluid reservoir 116 has a communication port 132 receiving a ported plug 134 extending into the cylinder 110.

The piston 120 is constructed with a grooved cutaway portion about its inner periphery so as to receive the rubber washer 136 having lips which upon the compression stroke distend so as to insure a seal-tight closure for the piston.

The piston further has a passage 138 formed angularly so as to receive the slidable grooved stem 140 of the conical valve 142 seated in the angular conical recess 144 of the piston head. The stem 140 is provided with a longitudinal slot adapted to receive a retaining pin 146.

The rear of the piston 118 is provided with a "cut-away" portion so as to permit the travel of the piston without interference of the extending channeled plug 134, and to permit communication of the reservoir 116 with the hollow boot 180. The rear of the piston is secured against rearward displacement by the washer 148 and split spring 150.

The channeled plug 134 serves the double purpose of acting as a communication port and as a tripping member for the valve 142 when the piston is in its maximum retracted position to compensate for any fluid that may have been lost throughout the system during the braking thereof.

In the operation of my device, as the foot pedal lever 102 is depressed, the force is transmitted through the clevis 123 to the rod 122 which in turn starts the piston 120 on its compression stroke. The pressure created by the fluid at the head of the piston 120 retains the valve 142 in its seat prohibiting any back flow.

The resultant pressure of the compression stroke causes flow of fluid through the discharge port 112 to the conduit 108 and into the motors 114 causing the movement of the shoes 54 and 56 against the force of the rectractile spring 58.

As the foot pedal 102 is released the rod 122 and piston 120 travel to their retracted position. The retaining pin 146 holds the valve 142 and avoids complete displacement should vacuum be created on the upward stroke at the head of the piston. As the piston reaches its maximum retracted position, the plug or pin 134 at its rear contacts the stem 140 of the valve tripping it off its seat to permit inflow of fluid from the reservoir should any have been lost in the system during the compression stroke.

While a single illustrative embodiment has been described in detail, it is not my intension to limit the scope of the invention to this particular embodiment, or otherwise than by the terms of the appended claims.

I claim:

1. In a master cylinder, a reservoir, a cylinder having one end in communication with said reservoir and the other end provided with a braking fluid port, a piston reciprocable within said cylinder having a passage extending generally longitudinally therethrough, means for operating the piston including a member engageable with the rear end of the piston at substantially the center of said end, said passage being inclined with respect to the axis of the piston with one end opening through the forward end of the piston substantially on the axis of said piston and with the other end terminating at the rearward end of said piston at a point between the point of engagement of said operating member and the adjacent wall of said cylinder, a valve for controlling said passage, said valve having a stem extending within said passage and terminating adjacent the rearward end of said piston, and a stop upon said cylinder wall directly engaging the stem of said valve to unseat the latter when the piston is in its retracted position.

2. In a horizontal master cylinder, a fluid reservoir, a cylinder formed with said reservoir and adapted to communicate therewith, a piston reciprocable in said cylinder having a slotted portion permitting communication of fluid to the rear of said piston and having an angular passage therethrough, a valve controlling said passage, means carried by the piston to hold the valve against complete displacement on its return stroke, and a channeled member extending into the cylinder supplying fluid thereto and adapted to actuate said valve to open position when the piston is in its retracted position.

3. A fluid pressure producing device comprising a cylinder, a piston reciprocable in said cylinder and having an angular by-pass therethrough, a valve controlling the by-pass, and a fluid supplying member extending into the cylinder and arranged to trip the valve to open position when the piston is in its retracted position.

4. A fluid pressure producing device comprising a cylinder, a slotted piston reciprocable in said cylinder having an angularly disposed by-pass therethrough, a valve controlling the by-pass, and a supply tube extending into the cylinder adapted to actuate the valve to open position on the return stroke of the piston.

RUDOLPH A. GOEPFRICH.